United States Patent
Wei et al.

(10) Patent No.: US 8,309,242 B2
(45) Date of Patent: Nov. 13, 2012

(54) BATTERY CELL

(75) Inventors: Di Wei, Cambridge (GB); Zoran Radivojevic, Cambridge (GB); Chris Bower, Ely (GB); Piers Andrew, Cambridge (GB); Teuvo Tapani Ryhänen, Cambridge (GB)

(73) Assignee: Nokia Corporation, Espoo (FI)

( * ) Notice: Subject to any disclaimer, the term of this patent is extended or adjusted under 35 U.S.C. 154(b) by 166 days.

(21) Appl. No.: 12/611,389

(22) Filed: Nov. 3, 2009

(65) Prior Publication Data

US 2011/0104534 A1 May 5, 2011

(51) Int. Cl.
*H01M 4/13* (2010.01)
(52) U.S. Cl. ............... 429/91; 429/218.1; 429/231.5
(58) Field of Classification Search ............ None
See application file for complete search history.

(56) References Cited

U.S. PATENT DOCUMENTS

| | | | |
|---|---|---|---|
| 4,497,881 A | 2/1985 | Bertolino | 429/91 |
| 5,458,992 A | 10/1995 | Bailey | 429/93 |
| 5,952,125 A | 9/1999 | Bi et al. | 429/231.2 |
| 6,130,007 A | 10/2000 | Bi et al. | |
| 6,294,111 B1 | 9/2001 | Shacklett, III et al. | 252/518.1 |
| 2002/0142218 A1 | 10/2002 | Reitz et al. | |
| 2009/0057137 A1 | 3/2009 | Pitts et al. | |

FOREIGN PATENT DOCUMENTS

| | | |
|---|---|---|
| JP | 1272044 A | 4/1988 |
| JP | 2051847 A | 8/1988 |

OTHER PUBLICATIONS

G. Gu, M. Schmid, P. W. Chiu, A. Minett, J. Fraysse, G. T. Kim, S. Roth, M. Kozlov, E. Munoz and R. H. Baughman, "$V_2O_5$ Nanofibre Sheet Actuators", Nature Materials 2(2003) pp. 316-319.

PhD Thesis by AV Murugan, "Synthesis and Characterization of Organo—inorganic Conducting Polymer Based Nanocomposites for Electrochemical Power Sources", (Aug. 2004), 156 pages.

Aiping, J et al, "electrical and electrochemical characterization of poly (ethylene oxide)/$V_2O_5$ xerogel electrochromic films", Solid State Ionics 179 (2008) pp. 1256-1262.

*Primary Examiner* — Patrick Joseph Ryan
*Assistant Examiner* — Wyatt McConnell
(74) *Attorney, Agent, or Firm* — Harrington & Smith (57) ABSTRACT

A battery cell including: an anode configured to operate as a source of cations during discharge of the battery cell; and an electrolyte configured to transport the cations from the anode to the a cathode during discharge of the battery cell, wherein the cathode includes material that is configured to enable the reversible insertion of transported cations during discharge of the battery cell and that has optical properties that are dependent upon cation insertion and that is viewable by a user.

20 Claims, 5 Drawing Sheets

BATTERY CELL

FIELD OF THE INVENTION

Embodiments of the present invention relate to a battery cell. In particular, they relate to methods and apparatus concerning a re-chargeable battery cell.

BACKGROUND TO THE INVENTION

A battery cell stores energy which can be output as electrical power.

A rechargeable battery cell may be recharged by providing electrical power to the battery cell. The battery cell stores energy which is output as electrical power as the battery cell discharges.

When a battery cell is incorporated into an apparatus, the apparatus when switched on may provide on a display an indication of the energy currently stored in a battery cell. This uses some of the battery cell's energy However, it is inconvenient to have to switch on the apparatus to assess the energy currently stored in a battery cell.

BRIEF DESCRIPTION OF VARIOUS EMBODIMENTS OF THE INVENTION

According to various, but not necessarily all, embodiments of the invention there is provided a battery cell comprising: an anode configured to operate as a source of cations during discharge of the battery cell; and an electrolyte configured to transport the cations from the anode to the a cathode during discharge of the battery cell, wherein the cathode comprises material that is configured to enable the reversible insertion of transported cations during discharge of the battery cell and that has optical properties that are dependent upon cation insertion and that is viewable by a user.

This provides the advantage that the user is able to determine the charge state of the battery cell by viewing the material and without taking any other action.

It is also possible for a user to determine the energy stored in the battery cell without the use of energy. There is no need to power an additional readout display or sensor Such battery cells enable new device architectures and designs. For example, a battery cell that indicates energy stored in the battery cell using a visible colour change may be incorporated into a case of a device or may constitute the case itself.

The anode may be a lithium based anode in which case the cations are lithium ions.

The battery cell may comprise a housing having an exterior housing portion that enables a user, by visual inspection through the exterior housing portion, to identify a change in the optical properties of the material.

The cathode may comprise a translucent or transparent substrate that enables a user, by visual inspection through the substrate, to identify a change in the optical properties of the material.

The cathode may comprise a translucent or transparent conductive electrode film that is located between the substrate and the material.

The battery cell may have an exterior surface area. The material may be viewable by a user through at least 20% of the exterior surface area.

The color of the material may be dependent upon cation insertion.

The material may be a nanomaterial. The material may comprise a plurality of elongate nano-structures such as, for example, nanofibres.

The material may be comprised of Vanadium (V) oxide.

The electrolyte may be a solid polymer.

According to various, but not necessarily all, embodiments of the invention there is provided a method of manufacturing a battery comprising:

combining a cathode comprising material that is configured to enable the reversible insertion of transported cations during discharge of the battery cell and that has optical properties that are dependent upon cation insertion; an anode configured to operate as a source of cations during discharge of the battery cell; and an electrolyte configured to transport the cations from the anode to the cathode during discharge of the battery cell, such that at least a portion of the material is viewable by a user.

According to various, but not necessarily all, embodiments of the invention there is provided a battery cell comprising: an anode configured to operate as a source of cations during discharge of the battery cell; and an electrolyte configured to transport the cations from the anode to the a cathode during discharge of the battery cell, wherein the cathode comprises elongate nano-structures that enable the reversible insertion of transported cations during discharge of the battery cell.

According to various, but not necessarily all, embodiments of the invention there is provided a method of forming an electrode comprising:

a) forming a vanadium (V) oxide sol from a vanadate reagent, acidic ion exchange resin and water;
b) heating;
c) leaving to stand and form nanofibres of vanadium (V) oxide; and
d) depositing nanofibres on a substrate According to various, but not necessarily all, embodiments of the invention there is provided a battery cell comprising: an electrode configured to operate as a source of ions; an electrolyte configured to transport the ions from the anode to the a second electrode, wherein the second electrode comprises material that is configured to enable the reversible insertion of transported ions and that has optical properties that are dependent upon ion insertion and that is viewable, at least in part, by a user.

BRIEF DESCRIPTION OF THE DRAWINGS

For a better understanding of various examples of embodiments of the present invention reference will now be made by way of example only to the accompanying drawings in which:

FIG. 10 schematically illustrates a method for incorporating a cathode into a battery cell 2.

DETAILED DESCRIPTION OF VARIOUS EMBODIMENTS OF THE INVENTION

The Figures schematically illustrate a battery cell 2 comprising: a first electrode 4 configured to operate as a source/sink of ions 11; a second electrode 4 configured to operate as a sink/source of ions 11; and an electrolyte 6 configured to transport the ions 11 between the first electrode 4 and a second electrode 8. The second electrode 8 comprises material 20 that is configured to enable the reversible insertion (intercalation) of the ions 11. The material is viewable by a user 12 and has optical properties that are dependent upon ion insertion at the material.

In some but not necessarily all embodiments, the first electrode 4 may operate as a source of ions during discharging of the battery cell and the second electrode 4 may operate as a sink for those ions. The second electrode 4 sinks the ions by their insertion (intercalation) at the material 20. The first electrode 4 may then operate as a sink of ions during charging of the battery cell 2 and the second electrode 4 may operate as a source for those ions. The second electrode 4 sources the ions 11 by reversing the insertion (intercalation) of the ions at the material 20.

In some but not necessarily all embodiments, the ions 11 may be cations, for example, lithium ions.

The material 20 is configured to enter any one of a plurality of charging dependent states having different associated ion insertion and consequently different associated optical properties. The material 20 is configured to remain in a charging dependent state without input of energy until additional charging or discharging changes the charging state. The new charging state will have different associated ion insertion and consequently have different associated optical properties. Consequently the charging state of the battery cell 2 can be mapped to the current optical property of the material 20. The battery cell is configured so that the current optical property of the material is apparent to a user on visual inspection of the battery cell and. A user, by simple visual inspection of the battery cell is then able to determine the battery cell's charging state.

The material 20 is optically ion-dependent. Its optical properties depend upon ion insertion (intercalation). The optical transmission spectrum of the material within the range of human-visible frequencies may be dependent upon cation insertion. For example, in some embodiments the material 20 may be ionochromatic. "Ionochromatic" in this document means that the apparent color of the material 20 to a human user is dependent upon the extent to which ions are inserted in the material 20. A simple transparent or translucent window to the material 20 is therefore all that is required to enable visual inspection by a user 12 of the optical property (color) of the material 20. In another embodiment, ion-dependency may result, for example, in a change in polarization of the material 20 in which case a polarizing window to the material is all that is required to enable visual inspection by a user of the optical property (polarization). Thus the ion-dependent 'optical properties may include properties such as but not limited to; transmission, reflection, polarization, or changes in chromaticity which might be defined by CIE coordinate change, or a change in optical density which does not require any color at all merely a change in perceived brightness (like a grayscale change). CIE is the International Commission on Illumination, and defines a standard used to quantify color. It uses a chromaticity coordinate x, y and a brightness component Z.

Figure 1:
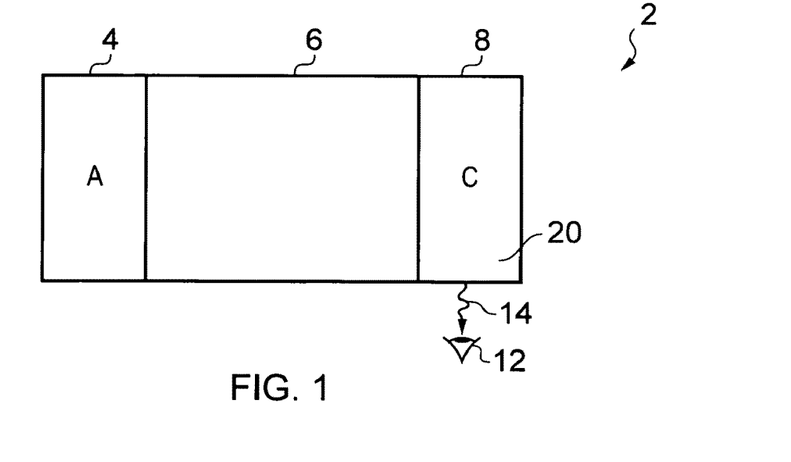
FIG. 1 schematically illustrates an embodiment of a battery cell.

FIG. 1 schematically illustrates an embodiment of the battery cell 2 previously described.

In this embodiment, the battery cell 2 comprises an anode 4, a cathode 8 and an electrolyte 6.

The anode 4 is configured to operate as a source of cations 11 during discharge of the battery cell 2 and as a sink for cations during charging of the battery cell 2.

The cathode 8 is configured to operate as a sink for cations 11 during discharge of the battery cell 2 and as a source of cations during charging of the battery cell 2. The cathode 8 comprises material 20 that is configured to enable the reversible insertion of transported cations. During discharge of the battery cell 2 the cations are inserted in the material 20. During charging the insertion is reversed.

Figure 2A:
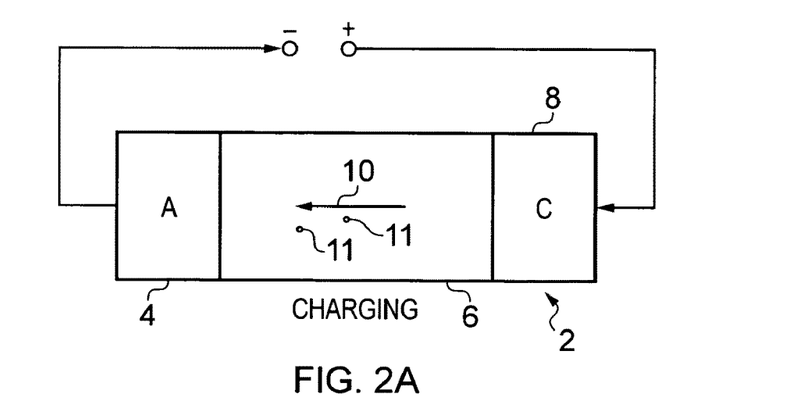
FIG. 2A schematically illustrates transport the cations to anode from the cathode during charging of the battery cell.

The electrolyte 6 is configured to transport the cations to anode 4 from the cathode 8 during charging of the battery cell 2 as illustrated in FIG. 2A. The transport of the cations 11 is indicated as ion current 10 in the Figure.

Figure 2B:
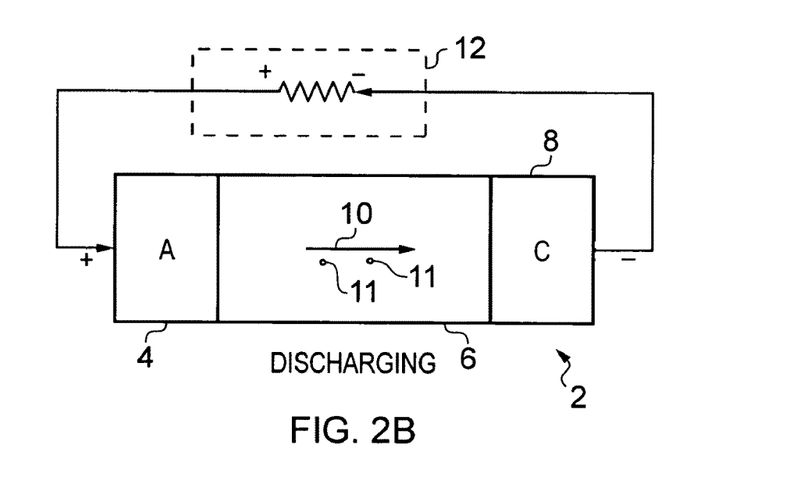
FIG. 2B schematically illustrates transport of the cations from the anode to the cathode during discharge of the battery cell.

The electrolyte 6 is configured to transport the cations 11 from the anode 4 to the cathode 8 during discharge of the battery cell 2 as illustrated in FIG. 2B. The transport of the cations 11 is indicated as ion current 10 in the Figure.

The cathode 8 comprises material 20 that has optical properties that are dependent upon cation insertion. The material 20 is viewable, at least in part, by a user 12.

The material 20 is configured to enter any one of a plurality of charging states having different associated cation insertion and consequently different associated optical properties. The charging states are 'stable' in that the material 20 remains in a charging state without input of energy until additional charging or discharging changes the charging state. The new charging stab will have different associated cation insertion and consequently have different associated optical properties. Consequently the charging state of the battery cell 2 can be mapped to the current optical property of the material 20. The battery cell is configured so that the current optical property of the material is apparent to a user on visual inspection 14 of the battery cell 2. A user, by simple visual inspection of the battery cell is then able to determine the battery cell's charging state.

The material 20 may be comprised of transition metal compound. The material 20 may be organic or inorganic. The material 20 may be comprised of a chalcogenide such as a transition metal chalcogenide. The chalcogenide may be, for example, an oxide such as a transition metal oxide. An example of a suitable transition metal oxide is vanadium (V) oxide $V_2O_5$, Vanadium (V) oxide $V_2O_5$, is an example of an ionochromatic material. It is believed that the initial yellow vanadium (V) oxidation state changes on ion insertion to a blue vanadium (IV) oxidation state $[VO(H_2O)_5]^{2+}$, then to a green vanadium (III) oxidation state $[V(H_2O)_6]^{3+}$ and then to a violet vanadium (II) oxidation state $[V(H_2O)_6]^{2+}$.

For $V_2O_5$, during lithiation, Li+ ions are incorporated into the oxide and at the same time $V_5+$ sites are reduced to $V_4+$ by donating an electron. Solid battery electrolyte such as PEO/$V_2O_5$ electrochromic films favor the kinetics of $V_4+/V_5+$ solid state redox transitions.

Other examples of ionochromatic materials include inorganic particles such as $W_2O_3$ and organic conducting polymers such as polyaniline, polypyrrole etc.

It is possible to create ionochromic color change with arbitrary colors by using a subtractive colour system based on primary colors; Cyan, Yellow, Magenta, Terephthalates such as those described by Kobayashi et. al. "organic electrochromism for a new color electronic paper" Solar energy materials and solar cells 92 (2008) 136-139.

An example of a material that is optically ion-dependent but not or not solely ionochromatic is polyaniline This material's color depends on the doping state (how many anions are inserted into the polymer backbone), but is not solely ionochromatic since the oxidation state also determines its color Most p-type conducting polymers change color when anions are inserted.

Figure 3:
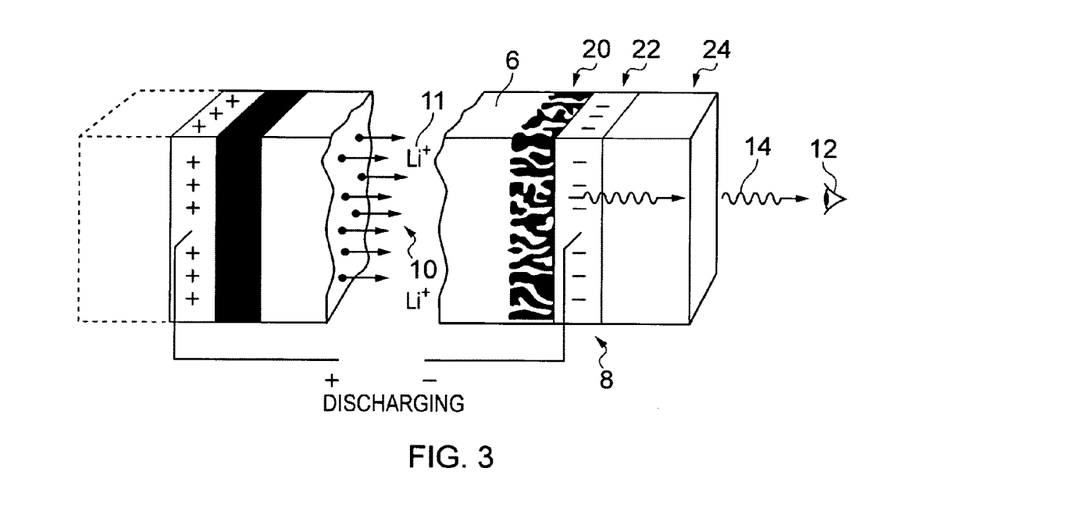
FIG. 3 schematically illustrates a particular embodiment of the battery cell 2 previously described with reference to FIGS. 1, 2A and 2B.

FIG. 3 schematically illustrates a particular embodiment of the battery cell 2 previously described with reference to FIGS. 1, 2A and 2B.

In this example the battery cell 2 is a rechargeable lithium based battery cell. The anode 4 operates as a source of lithium ions (Li+) during discharging and operates as a sink for lithium ions during charging.

The battery cell 2 may be a lithium battery where the anode 2 comprises lithium metal as the source/sink.

The battery cell 2 may be a lithium ion battery where the anode 2 comprises a material that intercalates Li ions such as, for example, graphite.

In this example, the battery cell 2 is an organo-inorganic hybrid. The electrolyte is a polymer.

In the illustrated example, the polymer electrolyte is a solid polymer. This facilitates the manufacture of the battery cell 2 and simplifies the battery cell structure as no encapsulation for a liquid electrolyte is required.

Examples of suitable non-polymer electrolytes include ionic liquid electrolytes and inorganic solid lithium electrolyte such as Lithium Phosphorus Oxynitride (LiPON) electrolyte. Examples of suitable polymer electrolytes include PEO—Poly(Ethylene Oxide) (PEO) and its derivatives. Examples of suitable solid polymer electrolytes include PEO and its derivatives In this example, the supporting structure for the material 20 is transparent or translucent to enable a user 12 to view the material 20.

The supporting structure comprises a translucent/transparent substrate 24 and a transparent/translucent electrode film that provides a terminal of the battery cell 2.

The translucent or transparent substrate enables a user, by visual inspection through the substrate, to identify a change in the optical properties of the material 20.

The substrate 24 may be a flexible substrate. The substrate 24 may be formed from polyethylene terephthalate (PET) film for example but other substrates, such as: polyesters, polyethylene polymer, cellulose ester, cellulose triacetate, cellulose diacetate, cellulose acetate propionate, cellulose acetate butyrate; polyesters, poly(ethylenenaphthenate), poly (1,4-cyclo-hexanedimethylene terephthalate), poly(butylene-terephthalate), polyamides; polycarbonates, polystyrene; polyolefins, polyethylene, polypropylene or polybutylene, polysulfones, polyacrylates; polyetherimides; polyvinyl chloride; polyvinylacetate; polyvinylamine; polyurethane; polyacrylonitrile; polyacetal; polytetrafluoroethene; polyfluorovinylidene; polysiloxane; polycarboranes; polyisoprene or other rubbers; and polyethylene naphathalate (PEN) which is a transparent robust polymer substrate.

The electrode film may, for example, be formed from indium tin oxide (ITO). Or other transparent conductive oxide such as Aluminium doped zinc oxide AZO, Fluorine doped tin oxide, Mg-doped ZnO (MZO), Ga-doped ZnO (GZO), Al-doped MZO (AMZO), Ga-doped MZO (GMZO), or transparent conducting polymers such as Poly(3,4-ethylene-dioxythiophene) poly(styrenesulfonate).

The electrolyte 6 may also be transparent or translucent to enable light to pass from the electrolyte through and material 20 and the supporting structure to the user 12.

In this example, the material 20 is comprised of Vanadium (V) oxide which is an ionochromatic material.

Figure 5A:
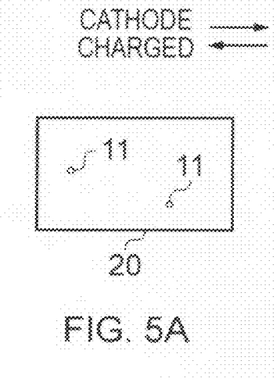
FIG. 5A schematically illustrates a charged state of material of the cathode.

FIG. 5A schematically illustrates a first charged state of the material 20. In this state, the material 20 has few inserted lithium ions and has a first optical property (a transparent/white color). The material 20 is in this state when the battery cell is charged. The material 20 remains in this state until the battery starts discharging.

Figure 5B:
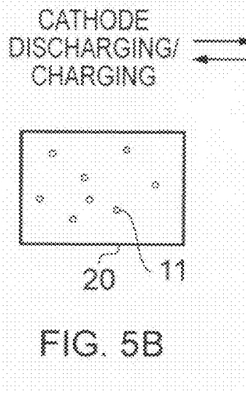
FIG. 5B schematically illustrates a partially charged state of the material of the cathode.
Figure 5C:
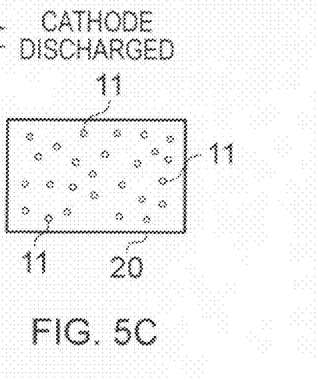
FIG. 5C schematically illustrates a discharged state of the material of the cathode.

FIG. 5C schematically illustrates a second discharge state of the material 20. In this state, the material 20 has many inserted lithium ions and has a second optical property (a dark blue color). The material 20 is in this state when the battery cell is discharged. The material 20 remains in this state until the battery starts charging.

FIG. 5B schematically illustrates a third partially charged state of the material 20. In this state, the material 20 has some inserted lithium ions and has a third optical property (a blue color). The material 20 is in this state when the battery cell is between the first charged state and the second discharged state. The material 20 remains in this state until the battery starts charging or discharging.

The first, second and third optical properties are such that a user can discriminate between them by visual inspection of the material 20.

Figure 4:
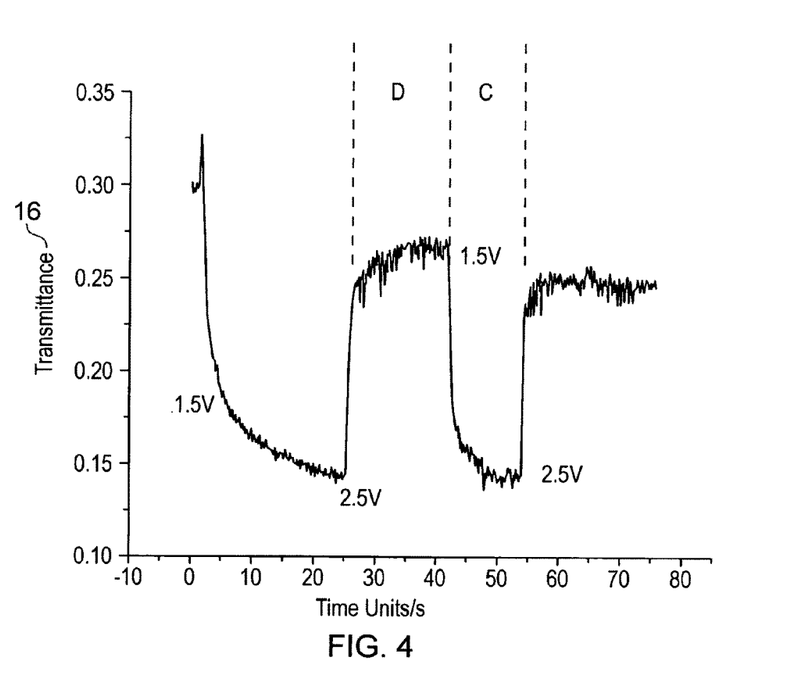
FIG. 4 is a schematically illustration of transmittance of the material of the cathode in a charged state and in a discharged state.

FIG. 4 is a schematically illustration of the first charged state D and the second discharged state C. The Figure illustrates the transmittance of blue light.

When the material 20 is in the discharged state C the transmittance is low whereas when the material 20 is in the charged state C the transmittance is higher. The change in transmittance between states is an approximate 70% increase in transmittance and an approximate 60% decrease in transmittance.

Figure 6:
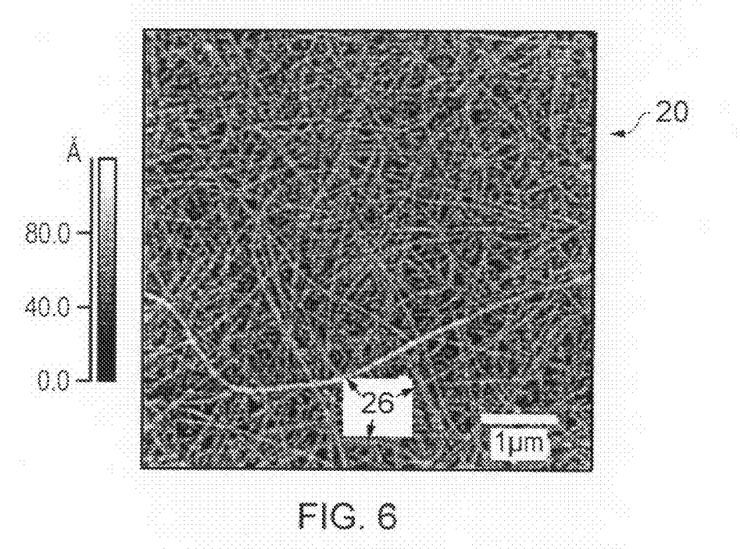
FIG. 6 schematically illustrates one example of suitable structural form for the material of the cathode.

FIG. 6 schematically illustrates one example of suitable structural form for the material 20. In this example, the material 20 is a nanomaterial. A nanomaterial is a material that is composed of discrete components where each component has a minimum dimension that is less that 1 μm.

In this example, the material comprises a plurality of elongate nano-structures which has a long length which is greater than 1 μm but a normal cross-sectional area with a maximum dimension significantly less than 1 μm. In this example, the elongate nano-structures are nanofibres which for the purpose of this document are elongate nano-structures that have a normal cross-sectional area with a maximum dimension significantly less than 100 nm.

It has been found that the use of a nanomaterial improves the energy storage capacity and improves ionochromatic properties of the material.

Figure 7:
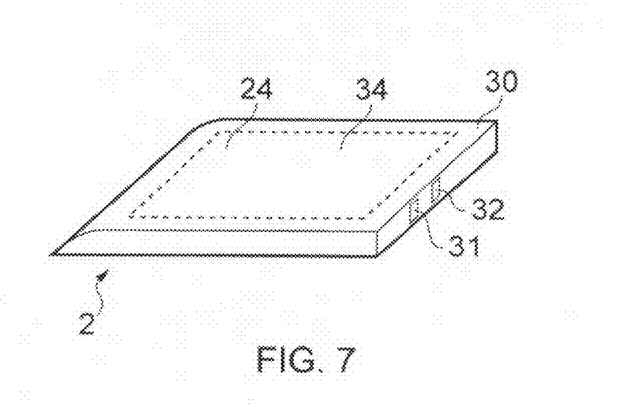
FIG. 7 schematically illustrates a battery cell comprising an exterior housing.

FIG. 7 schematically illustrates a battery cell 2 comprising an exterior housing 30 that exposes first and second terminals 31, 32. The exterior housing 30 has an exterior housing portion 34 that enables a user, by visual inspection through the exterior housing portion, to identify a change in the optical properties of the material 20.

Referring back to the example of FIG. 3, the substrate 24 may be aligned with or be part of the exterior housing portion 30.

In the illustrated example, the battery cell has a exterior surface area and exterior housing portion occupies at least 20% of the exterior surface area. Consequentially the material 20 is viewable by a user through at least 20% of the exterior surface area of the battery cell 2.

The large area may be used like a display with colorization of the pixels by the amount of energy available to be spent by user.

Figure 8:
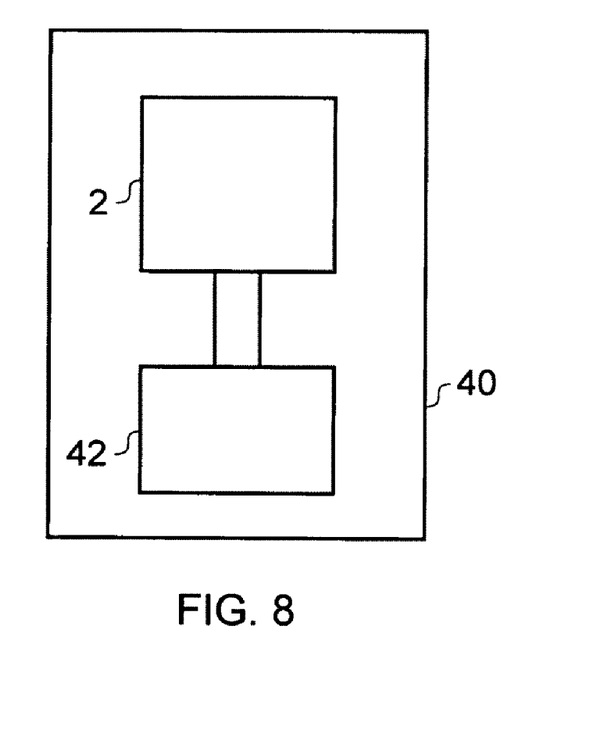
FIG. 8 schematically illustrates an apparatus comprising: electrical components and a battery cell.

FIG. 8 schematically illustrates an apparatus 40 comprising: electrical components 42 and a battery cell 2 as claimed in any one of claims 1 to 21 for providing power to the electrical components 42.

The apparatus 40 may be, for example, a portable device such as a handheld device.

The apparatus 40 may be, for example, a portable electronic device such as a mobile phone, a personal music device, a personal multimedia device, a recording device.

Figure 9:
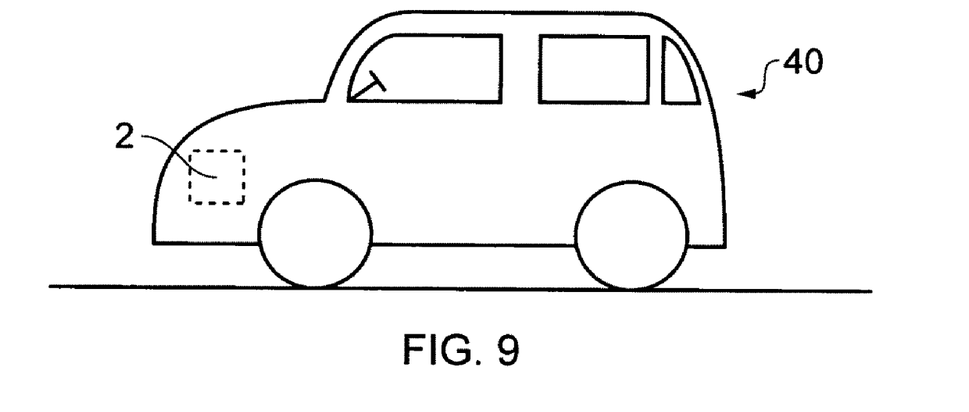
FIG. 9 schematically illustrates an electrically powered vehicle.

In a further embodiment, the apparatus 40 may be an electrically powered vehicle as illustrated in FIG. 9. The battery cell 2 may be a primary or secondary drive cell for the vehicle.

Figure 10:
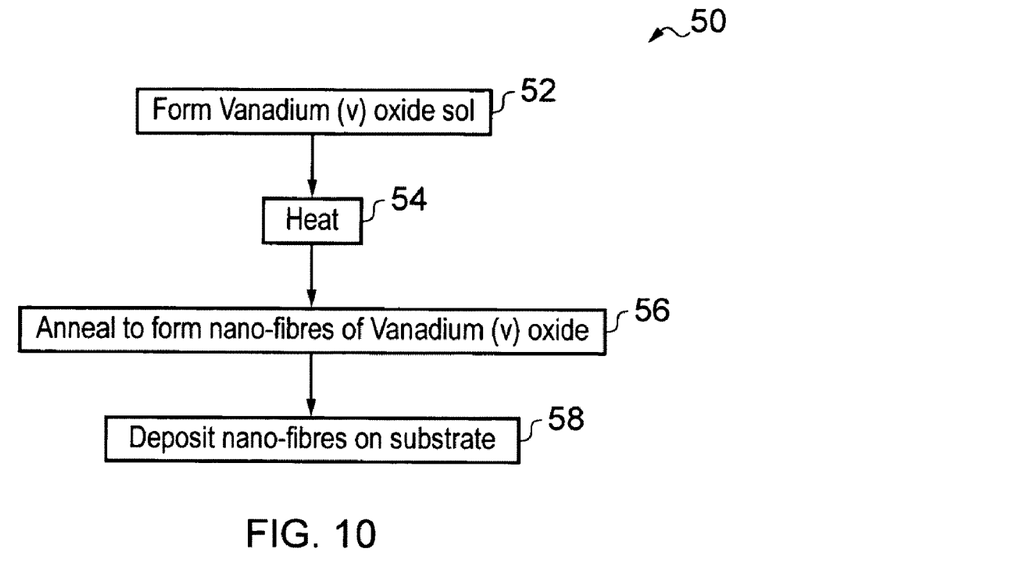
FIG. 10 schematically illustrates a method for manufacturing cathode material as nanofibres.

FIG. 10 schematically illustrates a method 50 for manufacturing material 20 as nanofibres.

The method starts at block 52, where a vanadium (V) oxide sol is formed from a vanadate reagent acidic ion exchange resin and water.

The vanadate reagent is ammonium meta-vanadate $NH_4VO_3$. The ratio by weight of ammonium meta-vanadate: acidic ion exchange resin:water is approximately 1:10:200 as 0.4 g ammonium meta-vanadate and 4 g acidic ion exchange resin are mixed in 80 ml water.

Next at block 52, the vanadium (V) oxide sol is heated. The heating is at 60° C. for 20 minutes to produce an orange sol that darkened with time.

Next at block 54, the heated vanadium (V) oxide sol is left to cool and form nanofibres of vanadium (V) oxide.

The vanadium (V) nanofibres are ribbon shaped having a length significantly greater (more than 100 times greater) than a width, which is greater (between 4 and 20 times greater) than the thickness. In this example, the ribbon-shaped fibres up to 10 μm long, 10 nm wide, and 1.5 nm thick were obtained when the solution was left to stand at room temperature for one week.

The hydrated nanofibres prepared by this route, were found by X-ray diffraction and cryo-transmission electron microscopy, to have a double layer structure, with each layer consisting of two vanadium (V) oxide sheets.

Next at block 56, the nanofibres are deposited on a substrate. The substrate may comprise an indium tin oxide film that has been pretreated with 3-aminopropyltriethoxysilane to generate positively charged ammonium groups on the surface.

By modifying sol-gel methods, gyroid nanostructures of V2O5 can be made and SEM image of such structured materials produced on transparent ITO glass substrate is shown in FIG. 5.

Figure 11:
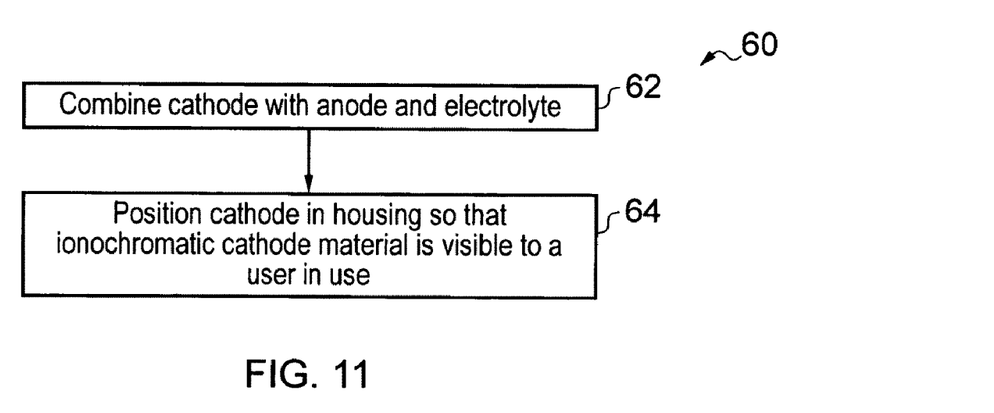
FIG. 11 schematically illustrates a method.

Once the cathode 8 has been formed as described with reference to FIG. 10 it may be incorporated into a battery cell 2 as illustrated by method 60 in FIG. 11.

At block 62 the cathode is combined with the anode 4 and the electrolyte 6. At block 64 the cathode is positioned within a housing f the battery cell 2 so that the ionochromatic cathode material 20 is visible, at least in part, to a user during use of the battery cell 2.

As used here 'module' refers to a unit or apparatus that excludes certain parts/components that would be added by an end manufacturer or a user. The battery cell may be a module.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A battery cell comprising;
an anode configured to operate as a source of cations during discharge of the battery cell;
a cathode; and
an electrolyte configured to transport the cations from the anode to the cathode during discharge of the battery cell, wherein the cathode comprises material that is configured to enable the reversible insertion of transported cations during discharge of the battery cell and to have optical properties that are dependent upon cation insertion and that is viewable by a user and the material comprises Vanadium Oxide with a gyroid nano-structure.

2. A battery as claimed in claim 1, wherein reversing of the insertion of transported cations occurs during charging of the battery cell, wherein the material has a first state having a first optical property when the battery cell is in a charged state, has a second state having a second optical property when the battery cell is in a discharged state, and has a third state having a third optical property when the battery cell is in a partially charged state.

3. A battery as claimed in claim 1, wherein the material is configured to enter any one of a plurality of charging dependent states having different associated optical properties as a result of charging/discharging the battery cell and the material is configured to remain in a charging state without input of energy until additional charging or discharging changes the charging state.

4. A battery as claimed in claim 1, wherein the battery cell comprises a housing having an exterior housing portion that enables a user, by visual inspection through the exterior housing portion, to identify a change in the optical properties of the material.

5. A battery as claimed in claim 1, wherein the cathode comprises a translucent or transparent substrate that enables a user, by visual inspection through the substrate, to identify a change in the optical properties of the material.

6. A battery as claimed in claim 5, wherein the cathode comprises a translucent or transparent conductive electrode film that is located between the substrate and the material.

7. A battery as claimed in claim 1, wherein the battery cell has a exterior surface area and wherein the material is viewable by a user through at least 20% of the exterior surface area.

8. A battery as claimed in claim 1, wherein the color of the material is dependent upon cation insertion.

9. A battery as claimed in claim 1, wherein the material remains translucent or transparent upon cation insertion.

10. A battery as claimed in claim 1, wherein the material comprises a plurality of elongate nano-structures.

11. A battery as claimed in claim 1, wherein the anode is a lithium based anode and the cations are lithium ions.

12. A battery as claimed in claim 11, wherein the battery is an organo-inorganic hybrid and the electrolyte is a polymer.

13. A battery as claimed in claim 1, wherein the electrolyte is transparent or translucent.

14. An apparatus comprising:
electrical components and a battery as claimed in claim 1 for providing power to the electrical components.

15. A method comprising:
manufacturing a battery by combining
a cathode comprising material that is configured to enable the reversible insertion of transported cations during discharge of the battery cell and that has optical properties that are dependent upon cation insertion, wherein the material comprises Vanadium Oxide with a gyroid nano-structure;
an anode configured to operate as a source of cations during discharge of the battery cell; and
an electrolyte configured to transport the cations from the anode to the cathode during discharge of the battery cell, such that at least a portion of the material is viewable by a user.

16. A method as claimed in claim 15 wherein the cathode is formed by:
a) forming a vanadium (V) oxide sol from a vanadate reagent, acidic ion exchange resin and water;
b) heating;
c) leaving to stand and form nanofibres of vanadium (V) oxide; and
d) depositing nanofibres on a substrate.

17. A method comprising:
forming an electrode by:
a) forming a vanadium (V) oxide sol from a vanadate reagent, acidic ion exchange resin and water;
b) heating;
c) leaving to stand and form nanofibres of vanadium (v) oxide; and
d) depositing nanofibres on a substrate to form Vanadium Oxide with a gyroid nano-structure.

18. A method as claimed in claim 17, wherein the vanadate reagent is ammonium meta-vanadate $NH_4VO_3$.

19. A method as claimed in claim 18, wherein the ratio by weight of ammonium meta-vanadate: acidic ion exchange resin: water is approximately 1:10:200.

20. A battery as claimed in claim 1, wherein the optical properties of the material comprise any one of the following:
a change of polarization, transmission, reflection and brightness of the material.

* * * * *